(12) United States Patent
Moretto

(10) Patent No.: US 11,317,756 B2
(45) Date of Patent: May 3, 2022

(54) BEVERAGE PREPARATION DEVICE

(71) Applicant: LAICA S.P.A., Barbarano Vicentino (IT)

(72) Inventor: Maurizio Moretto, Vicenza (IT)

(73) Assignee: LAICA S.P.A., Barbarano Vicentino (IT)

( * ) Notice: Subject to any disclaimer, the term of this patent is extended or adjusted under 35 U.S.C. 154(b) by 528 days.

(21) Appl. No.: 16/092,102

(22) PCT Filed: Apr. 7, 2017

(86) PCT No.: PCT/EP2017/058451
§ 371 (c)(1),
(2) Date: Oct. 8, 2018

(87) PCT Pub. No.: WO2017/174805
PCT Pub. Date: Oct. 12, 2017

(65) Prior Publication Data
US 2019/0117009 A1    Apr. 25, 2019

(30) Foreign Application Priority Data

Apr. 8, 2016 (IT) .......................... 102016000036605

(51) Int. Cl.
| | |
|---|---|
| *A47J 31/44* | (2006.01) |
| *A47J 31/40* | (2006.01) |
| *A47J 31/60* | (2006.01) |
| *A47J 31/14* | (2006.01) |
| *A23L 3/00* | (2006.01) |

(52) U.S. Cl.
CPC ............. *A47J 31/4403* (2013.01); *A23L 3/00* (2013.01); *A47J 31/14* (2013.01); *A47J 31/40* (2013.01); *A47J 31/401* (2013.01); *A47J 31/44* (2013.01); *A47J 31/60* (2013.01); *A47J 31/605* (2013.01)

(58) Field of Classification Search
CPC .. A47J 31/14; A47J 31/40; A47J 31/44; A47J 31/60; A47J 31/4403; A47J 31/401; A47J 31/605; A47J 27/21183
See application file for complete search history.

(56) References Cited

U.S. PATENT DOCUMENTS

| | | |
|---|---|---|
| 4,995,311 A | 2/1991 | Naya |
| 2003/0051604 A1 | 3/2003 | Torigai |

(Continued)

FOREIGN PATENT DOCUMENTS

| | | |
|---|---|---|
| EP | 2583732 A1 | 4/2013 |
| WO | 01/50875 A1 | 7/2001 |
| WO | 2011/089434 A1 | 7/2011 |

OTHER PUBLICATIONS

International Search Report, dated Jun. 22, 2017.

*Primary Examiner* — Brian W Jennison
(74) *Attorney, Agent, or Firm* — Dentons Bingham Greenebaum LLP; Brian W. Chellgren; James C. Eaves, Jr.

(57) ABSTRACT

A beverage preparation device comprising a main body, a tank, an assembly for pumping a liquid from the tank, and a unit for preparing the beverage, in which device an outlet path is defined inside the main body, the outlet path comprising a dispensing outlet, via which the beverage is dispensed out of the main body, and also comprising a filtering element that is detachably connected to the main body, wherein the filtering element is arranged downstream of the dispensing outlet relative to the outlet path.

13 Claims, 3 Drawing Sheets

(56) References Cited

U.S. PATENT DOCUMENTS

| | | | |
|---|---|---|---|
| 2005/0098575 A1* | 5/2005 | Carhuff | A47J 31/4485 |
| | | | 221/150 R |
| 2006/0196363 A1* | 9/2006 | Rahn | A47J 31/106 |
| | | | 99/279 |
| 2008/0038441 A1 | 2/2008 | Kirschner | |
| 2010/0021604 A1* | 1/2010 | Roulin | C02F 1/004 |
| | | | 426/506 |
| 2011/0233119 A1* | 9/2011 | Nelson | C02F 1/002 |
| | | | 210/117 |
| 2014/0251147 A1* | 9/2014 | Epars | A47J 31/605 |
| | | | 99/275 |

* cited by examiner

BEVERAGE PREPARATION DEVICE

The present invention relates to a beverage preparation device of the type comprising a main body, a tank for a liquid intended for preparing the beverage, a beverage outlet path and a filtering element that is detachably connected to the main body.

In the context of the technical sector of beverage preparation machines, it is known to use different types of filters in order to improve the quality of the water used in the beverage.

The filter is typically located in the water inlet section when there is a connection to the water supply network, or is located in a suitable tank intended to contain the water for the preparation of the beverage.

Although the presence of such filters can be useful for providing the machine with higher-quality water in terms of, for example, bacterial content or impurities of various kinds, it is obvious that bacteria and dirt can accumulate on the other components of the machine, e.g. the pump, the heating elements and in general the pipes intended for conveying the liquid to the beverage dispensing outlet, which bacteria and dirt inevitably lead to an undesirable bacterial load being present in the beverage dispensed.

Other solutions, which have been adopted but do not solve the problem, for positioning the filter are represented by said filters being located in the outlet of the tank, immediately upstream of the pump, or before the liquid-dispensing head.

This last solution is described, for example, in international patent application WO 2008/012314, which relates to a device for dispensing a beverage and, in particular, a product for infants, comprising water-heating means, water-discharge means and a bacterial filter placed between the water-heating means and water-discharge means. In that solution, the heated water passes through the filter before being dispensed from the device. The device further comprises means for heating those surfaces of the device that come into contact with the water after it has been filtered by the bacterial filter, in order to reduce the adhesion and proliferation of bacteria and biofilm in the region of the water-discharge means.

It is, however, clear that this solution involves the presence of additional components, making the device more costly and complex.

Moreover, this solution proves to be suboptimal when the device is used for preparing formula, wherein it is useful for the beverage dispensed to be of a sufficiently moderate temperature so that it does not need to be cooled again before being given to the infant.

However, the use of heating means like those described in WO 2008/012314, which in particular use a steam generator, inevitably leads to temperatures well above those suitable for giving the milk to an infant.

Similarly, neither does this solution prove suitable for use in all those machines used for preparing cold beverages, in which the beverage is obviously not heated, in particular close to the dispensing means.

Another known solution consists in using cartridges containing the product for preparing the beverage, comprising a filter in the area where they enter. In this case, effectively filtered water can be used for preparing the beverage but, clearly, the filter in the cartridge will have to be replaced every single time the machine is used.

The cost of filters capable of significantly eliminating the bacterial load does, however, make the solution just described financially disadvantageous. In this regard, it should also be noted that known filters are suitable for carrying out multiple filtration cycles before having to be replaced.

Therefore, the technical problem addressed by the present invention is that of providing a beverage preparation device capable of overcoming the drawbacks mentioned above in relation to the prior art.

Another object of the present invention is that of providing a beverage preparation device that allows a beverage having a sufficiently reduced bacterial content to be dispensed, without the liquid used for preparing the beverage being heated to boiling point.

Another object of the present invention is that of providing a beverage preparation device that does not require meticulous periodic cleaning operations to be carried out in order to avoid or, at any rate, limit the presence of bacteria in the beverage dispensed.

Another object of the present invention is that of providing a beverage preparation device that allows a beverage having a low bacterial load to be dispensed without having to wait for it to cool before it is given to an infant.

A further object is that of providing a beverage preparation device that allows a beverage having a low bacterial load to be dispensed without the need for additional components or complex operating mechanisms.

This problem is resolved and these objects are achieved by the beverage is preparation device according to claim 1.

Preferred features of the invention are defined in the dependent claims.

The present invention has some considerable advantages. The main advantage consists of the fact that the device according to the present invention allows a beverage having a sufficiently low bacterial load to be dispensed using a structurally simple and economic solution, without requiring the presence of additional components.

Furthermore, the beverage preparation method performed by the device according to the present invention does not provide for boiling or heating the liquid beyond temperatures suitable for administration to an infant.

The features and advantages of the invention will be more clearly apparent from the detailed description of some embodiments thereof, illustrated by way of non-limiting example, with reference to the attached drawings, in which.

Figure 1:
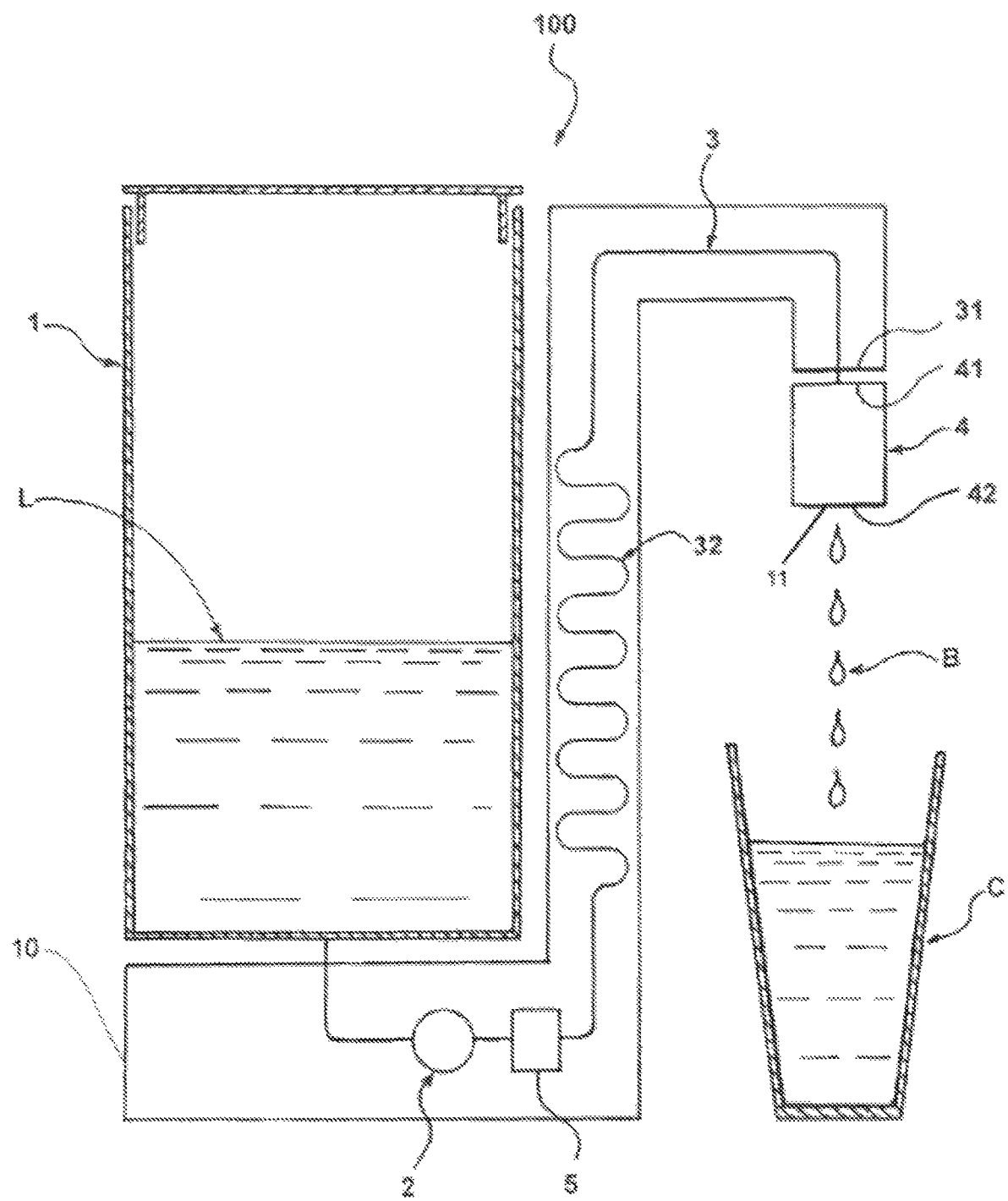
FIG. 1 is a schematic side view of a beverage preparation device according to the present invention.

With reference first to FIG. 1, a trickle-type filter device is indicated as a whole by reference numeral 100.

The device 100 comprises a main body 10, to which a tank 1 is connected, which tank is intended for containing the liquid to be used for preparing the beverage.

Typically, this liquid is water, but the use of other liquids may be considered if this is necessary for preparing the beverage.

In that regard, it should be noted that the present invention can be applied to the preparation of any type of beverage, both hot and cold. According to a preferred embodiment, the device is suitable for use in preparing formula, or other products for infants.

Furthermore, the preparation concept should be understood as any operation used for preparing a beverage for consumption by a person. Consequently, the device 100 can also simply be used for heating milk to be given to an infant, performing a process of bacterial filtration according to procedures that will be described in detail below.

In a preferred embodiment, a pump assembly 2 is housed inside the main body 10 and is intended for collecting the liquid L contained inside the tank 1 and sending it to a dispensing outlet 31 via an outlet path 3, preferably defined inside the main body 10.

As illustrated in FIG. 1, the liquid or beverage is dispensed via the dispensing outlet 31, if said liquid or beverage is prepared inside the main body 10, and is then poured into, for example, a container C.

According to a preferred embodiment, the device 100 comprises a beverage preparation unit 5 in which the liquid comes into contact with a product intended for preparing the beverage.

Following this interaction, depending on the type of beverage that is to be prepared, the product can be dissolved in the liquid contained in the tank—as happens, for example, when preparing formula—or can release elements into the liquid.

This unit can be housed inside the main body 10 or can be external to said main body.

By way of example, the unit 5 can be formed in the first case by another tank for holding the product to be dissolved in the liquid and by respective means for obtaining the necessary repeated operation involving these.

Preferably, the unit 5 is arranged upstream of the dispensing outlet 31.

In one embodiment, in order to also allow hot beverages to be prepared, the device 100 comprises a heating element 32 preferably arranged so as to be able to heat the liquid as it passes along the outlet path 3.

In a preferred embodiment, the heating element 32 is housed inside the main body 10.

The heating element 32 is preferably positioned downstream of the pump assembly 2 so as to ensure an optimal flow of liquid during heat exchange.

The beverage preparation device 100 further comprises a filtering element 4 detachably connected to the main body 10 for providing a filtration of the beverages prepared by the unit 5.

In the present invention, the filtering element 4 is positioned downstream of said dispensing outlet 31, relative to the outlet path 3. In other words, the filtering element 4 is positioned immediately opposite the outlet 31, such that all the pre-prepared liquid or beverage dispensed by the device is filtered through the filtering element 4 without having to pass through any other internal component of the device. Preferably, the filtering element 4 comprises a bacterial filter.

It should be noted that, in the context of the present invention, the term "bacterial filter" means a filter capable of eliminating or at least substantially reducing the bacterial content of a liquid passing through it. This can take place by physically impeding the passage of bacteria or by means of chemical reactions.

Examples of such filters can be represented by hollow fibre filters, filters having chemical elements such as bromine/chlorine, filters having nanomembranes or having graphene components.

Advantageously, this makes it possible to avoid any increase in the risk of bacteria being present in the beverage prepared by the device according to the present invention, due to infrequent maintenance resulting from difficulty in accessing the internal components or simply from a lack of care by the user.

In fact, the beverage is therefore bacteria-free—or at any rate contains a small amount of bacteria—without it being necessary to boil the product or heat it to a high temperature in any other way.

According to a preferred embodiment, the filtering element 4 comprises an inlet opening 41 connectable to the dispensing outlet 31, preferably in a sealed manner, when the element 4 is seated on the main body 10. In this manner, the outlet 31 and the filtering element can be protected in their area of connection from contact with air or other substances that could bring a bacterial load to the product. In one embodiment, the filtering element 4 also comprises an outlet opening 42 opposite the inlet opening 41, with filtering material F interposed between said openings.

In that regard, it should be noted that the device 100 preferably comprises a connection device (not shown in the figure) that is formed, for example, by a bayonet system allowing the filtering element 4 to be detachably coupled to the main body 10 in the position illustrated previously.

Preferably, the device 100 comprises a connecting element 11 for connecting the outlet opening 42 to a container C for collecting said beverage B or for collecting the product for preparing the beverage B.

In one embodiment, the connecting element 11 allows the outlet opening 42 of the filtering element to be connected to the container C, for example formed by a feeding bottle or other similar container, which is thus advantageously held in position. This solution is used, for example, when the beverage preparation unit is positioned inside the main body 10 or is absent.

Figure 2:
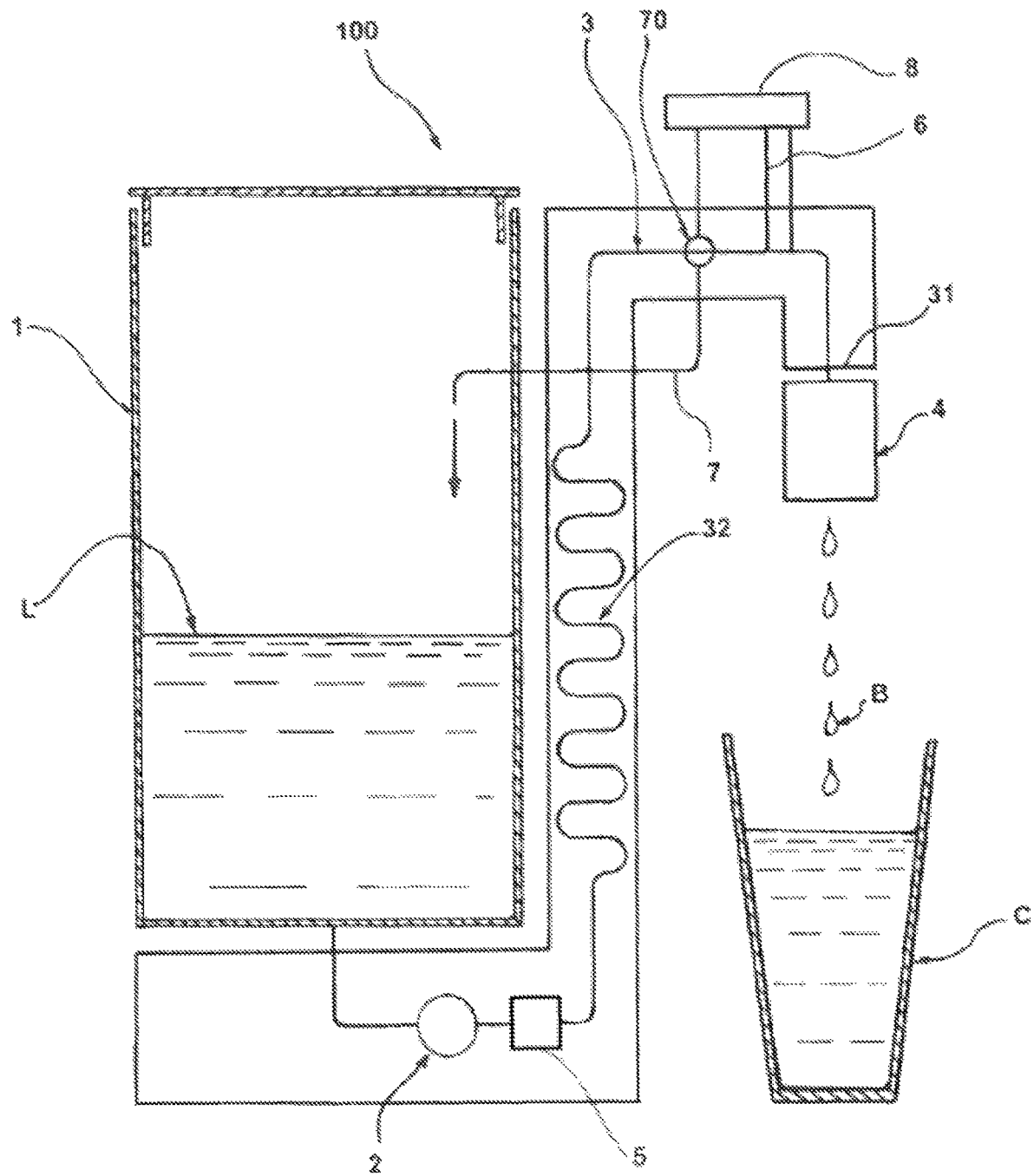
FIG. 2 is a schematic side view of a second embodiment of the beverage preparation device according to the present invention.

With reference now to FIG. 2, in an alternative embodiment of the invention, the device 100 comprises a device 6 for detecting the temperature of the beverage, which device is arranged upstream of the filtering element 4 and downstream of the heating element 32.

This temperature-detection device 6 makes it possible to establish whether the liquid or beverage that is dispensed by the device 100 is at a temperature that is above that suitable for the beverage to be consumed by an infant or is at a temperature that could damage the filtering element 4.

In one embodiment, the device 100 comprises an electronic circuit (not shown in the figure) that is connected to a control unit 8 that makes it possible to record the temperature value supplied by the temperature-detection device 6 and to act so as to stop the flow of liquid.

Preferably, for this purpose, the temperature-detecting element 6 is connected to a bypass path 7 which actually prevents the beverage from escaping via the dispensing outlet 31.

According to a preferred embodiment, the device 100 comprises a valve element 70 for diverting the beverage or liquid passing through the outlet path 3 towards the bypass path 7.

Preferably, the valve element 70 is operated by means of the control unit 8 after at least one predetermined temperature value has been detected by the temperature-detecting device 6.

The bypass circuit therefore allows the flow of liquid to be diverted from the outlet path 3 so that it can be returned to the tank 1 or at any rate so that it does not escape via the dispensing outlet 31.

Figure 3:
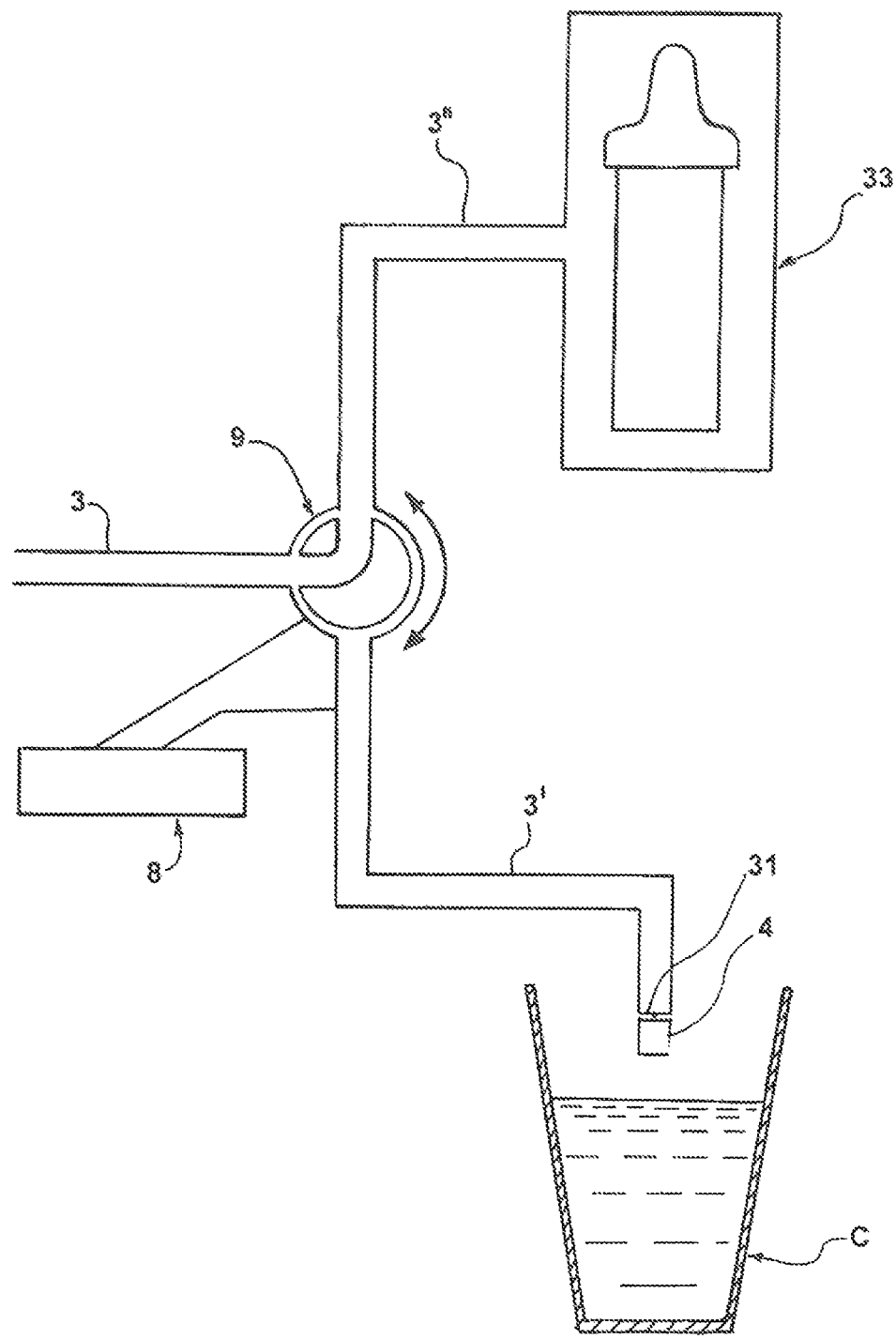
FIG. 3 is a partial schematic illustration of a third embodiment of the beverage preparation device according to the present invention.

In a further embodiment (shown in FIG. 3), the outlet path 3 comprises a dispensing portion 3', by means of which the beverage is directed towards the dispensing outlet 31, and a sterilisation portion 3", by means of which a sterilisation liquid supplied via the outlet path 3 is directed towards a sterilisation chamber 33.

By way of example, the sterilisation chamber 33 can be illustrated by a housing for a feeding bottle, which can thus be sterilised after steam enters said chamber. Preferably, the device 100 is able to select the portion of the outlet path 3 required depending on the desired operation, i.e. beverage preparation or sterilisation.

In one embodiment, for that purpose the device comprises a selector element 9 able to selectively intercept the dispensing portion 3' or the sterilisation portion 3". This makes it possible to prevent high-temperature liquid from being sent to the filtering element 4 during sterilisation operations, since the filtering action is not necessary in that case.

It should be noted that this embodiment can be adopted in combination with any one of the embodiments described previously.

The invention therefore solves the proposed problem, simultaneously achieving a plurality of advantages including the possibility of producing effective bacterial filtration without needing to raise the temperature of the liquid intended for preparing the beverage or other liquids.

The invention claimed is:

1. A beverage preparation device, comprising:
   a main body,
   a first tank for containing a liquid for the preparation of a beverage,
   an assembly for pumping the liquid from said first tank,
   a unit for preparing the beverage, said unit for preparing the beverage comprising a second tank for holding a product for preparing the beverage to be dissolved in the liquid, said unit for preparing the beverage being connected downstream of said first tank and wherein contact between the product for preparing the beverage and the liquid supplied from said first tank occurs in said unit for preparing the beverage,
   an outlet path defined inside said main body, said outlet path comprising a dispensing outlet arranged downstream of said unit for preparing the beverage and via which the beverage is dispensed out of said main body, and
   a filtering element that is detachably connected to said main body, said filtering element being arranged downstream of said dispensing outlet relative to said outlet path so as to provide a filtration of beverage prepared by said unit, said filtering element comprising an inlet opening connected to said dispensing outlet in a sealed manner.

2. The beverage preparation device according to claim 1, wherein said filtering element comprises an antibacterial filter.

3. The beverage preparation device according to claim 1, wherein said filtering element comprises a connection device allowing the filtering element to be detachably coupled to said main body.

4. The beverage preparation device according to claim 1, wherein said filtering element is positioned immediately opposite the outlet.

5. The beverage preparation device according to claim 1, wherein the filtering element comprises an outlet opening opposite said inlet opening, and filtering material interposed between said inlet opening and said outlet opening.

6. The beverage preparation device according to claim 5, further comprising a connecting element, which is formed as a separate body from said main body, for connecting said outlet opening to a container for collecting said beverage.

7. The beverage preparation device according to claim 1, comprising a heating element arranged so as to be able to heat the liquid as it passes through said outlet path.

8. The beverage preparation device according to claim 7, wherein said heating element is arranged downstream of said pump assembly.

9. The beverage preparation device according to claim 7, wherein said heating element is arranged downstream said unit for preparing the beverage and upstream said filtering element.

10. The beverage preparation device according to claim 7, further comprising a device for detecting the temperature of the beverage that is arranged upstream of said filtering element and downstream of said heating element.

11. The beverage preparation device according to claim 10, wherein said temperature-detecting device is connected to a bypass path for preventing the beverage from escaping via said dispensing outlet.

12. The beverage preparation device according to claim 11, comprising a valve element for diverting the beverage passing through the outlet path towards said bypass path, said valve element being operated by a control unit following the detection of at least one predetermined temperature value by said temperature-detecting device.

13. The beverage preparation device according to claim 1, wherein said outlet path comprises a dispensing portion for directing said beverage towards said dispensing outlet, and a sterilisation portion, wherein a sterilisation liquid supplied via said outlet path is directed towards a sterilisation chamber by said sterilisation portion, said device further comprising a selector element for selectively intercepting said dispensing portion or said sterilisation portion.

* * * * *